US007912072B1

(12) United States Patent
Boswell

(10) Patent No.: US 7,912,072 B1
(45) Date of Patent: Mar. 22, 2011

(54) COMMUNICATION WITH A REMOTE DEVICE

(75) Inventor: Alan James Boswell, Figtree (AU)

(73) Assignee: Nortel Networks Limited, Mississauga, Ontario (CA)

(*) Notice: Subject to any disclaimer, the term of this patent is extended or adjusted under 35 U.S.C. 154(b) by 1679 days.

(21) Appl. No.: 10/872,582

(22) Filed: Jun. 21, 2004

(51) Int. Cl.
*H04L 12/56* (2006.01)

(52) U.S. Cl. ............... 370/395.54; 370/397; 370/399; 370/401

(58) Field of Classification Search ............ 370/352, 370/389, 360, 401; 709/212, 228, 248, 250; 726/12
See application file for complete search history.

(56) References Cited

U.S. PATENT DOCUMENTS

| | | | | |
|---|---|---|---|---|
| 6,023,563 | A * | 2/2000 | Shani | 709/249 |
| 6,052,725 | A * | 4/2000 | McCann et al. | 709/223 |
| 6,061,739 | A * | 5/2000 | Reed et al. | 709/245 |
| 6,567,405 | B1 * | 5/2003 | Borella et al. | 370/389 |
| 6,591,306 | B1 * | 7/2003 | Redlich | 709/245 |
| 6,598,089 | B1 * | 7/2003 | Dumortier et al. | 709/238 |
| 6,757,281 | B1 * | 6/2004 | Irish | 370/389 |
| 6,961,336 | B2 * | 11/2005 | Coggeshall | 370/389 |
| 6,987,743 | B2 * | 1/2006 | Chen et al. | 370/328 |
| 7,007,080 | B2 * | 2/2006 | Wilson | 709/221 |
| 7,072,337 | B1 * | 7/2006 | Arutyunov et al. | 370/389 |
| 7,181,542 | B2 * | 2/2007 | Tuomenoksa et al. | 709/250 |
| 7,221,675 | B2 * | 5/2007 | Bryden et al. | 370/392 |
| 2002/0186698 | A1 * | 12/2002 | Ceniza | 370/401 |
| 2003/0002496 | A1 * | 1/2003 | Beier | 370/389 |
| 2003/0142684 | A1 * | 7/2003 | Miyachi | 370/401 |
| 2003/0172184 | A1 * | 9/2003 | Kong | 709/245 |
| 2003/0198219 | A1 * | 10/2003 | Coggeshall | 370/389 |
| 2004/0030804 | A1 * | 2/2004 | Wiget et al. | 709/245 |
| 2004/0052216 | A1 * | 3/2004 | Roh | 370/252 |
| 2004/0267874 | A1 * | 12/2004 | Westberg et al. | 709/200 |
| 2005/0068942 | A1 * | 3/2005 | Chu et al. | 370/352 |
| 2006/0013209 | A1 * | 1/2006 | Somasundaram | 370/389 |

OTHER PUBLICATIONS

David C. Plummer, "An Ethernet Address resolution Protocol," Nov. 1982, Network Working Group, RFC 826.*
Network Working Group, "Protocol Standard for a NetBIOS Service on a TCP/UDP Transport: Concepts and Methods," Mar. 1987, Network Working Group, RFC 1001.*
Finlayson, Matthew, "VPN Technologies—A Comparison," Feb. 2003, Data Connection Limited, p. 1-31.*

\* cited by examiner

*Primary Examiner* — Dang T Ton
*Assistant Examiner* — Ryan C Kavleski
(74) *Attorney, Agent, or Firm* — Withrow & Terranova, PLLC

(57) ABSTRACT

The present invention relates to communications between computing devices. Particularly there is provided a method for enabling communication between a local device of a first network having a predetermined upper layer address space, and a remote device having an upper layer address outside the first network's address space and a lower layer address. In the illustrative embodiments, the present invention enables communication with a remote device as though it were part of a local network by providing a virtual presence for the remote device in the local network address space.

39 Claims, 3 Drawing Sheets

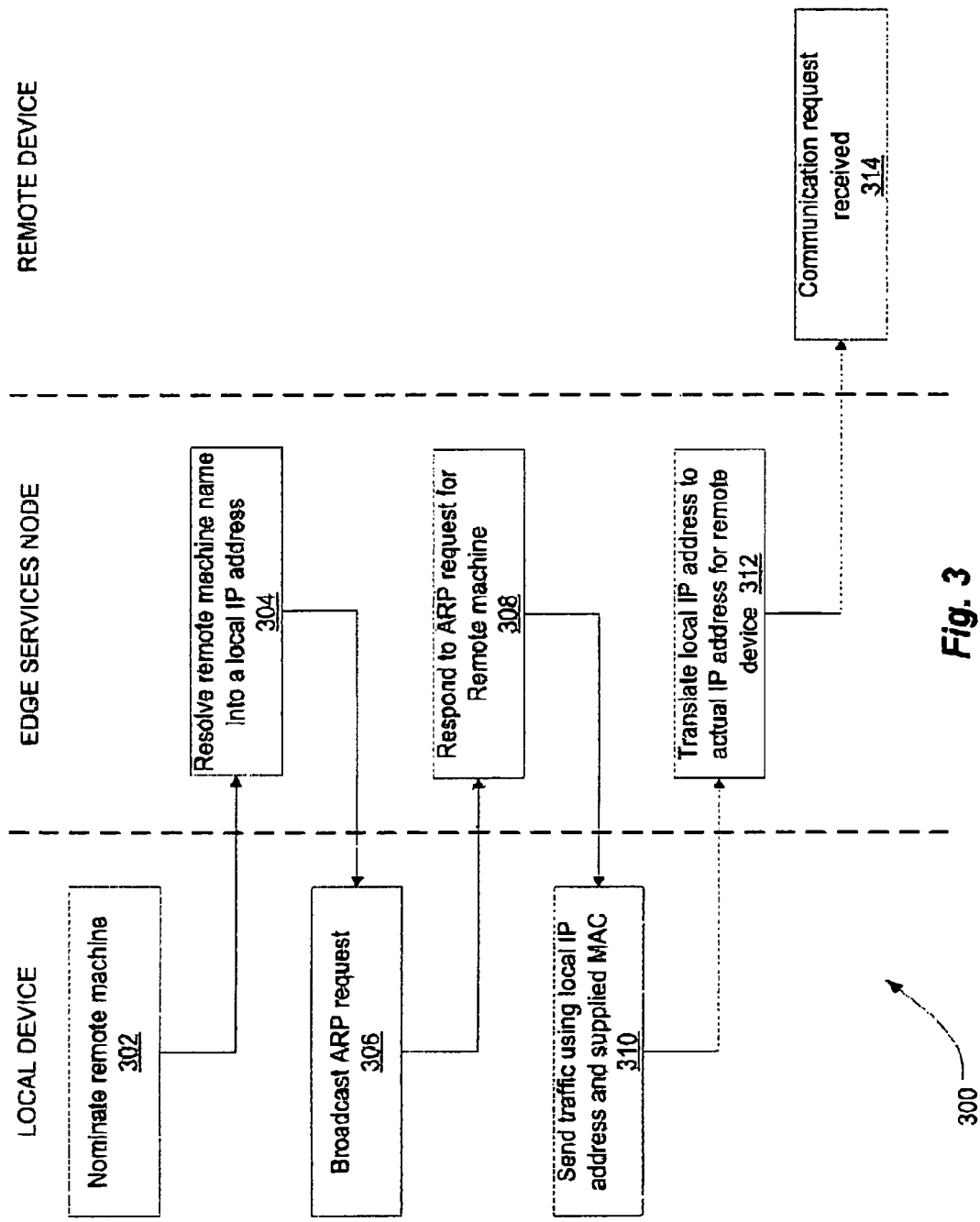

COMMUNICATION WITH A REMOTE DEVICE

FIELD OF THE INVENTION

The present invention relates to communications between computing devices. More particularly, the present invention relates to a method which enables a computer network to communicate with a remote device as if the device was a part of the network. The present invention also extends to a network implementing the method and network equipment configured to be used in the method.

BACKGROUND OF THE INVENTION

With the increasing popularity of "telecommuting" virtual private networks (VPNs) are increasingly being used by organizations to connect remotely located (e.g. staff) computers to the organization's local area network (LAN). VPNs are advantageous in that they do not require substantial hardware to implement as the "virtual network" is created across a pubic network, whilst also providing a relatively high level of security.

However, when creating Layer 2 VPNs of this type, the remote computer and the in-house LAN must share a common IP address space, as a single subnet. If the remote computer is a part of another network e.g. it is part a separate LAN, sharing a common IP address space is difficult and usually requires re-addressing the remote computer and those of the organisation into a common private or public address space. The inventors of the present invention have identified that this situation is not optimal and that in certain circumstances it would be preferable to allow the organization and the remote device (or its associated network) to maintain their original IP address space.

SUMMARY OF THE INVENTION

In a first aspect the present invention provides a method for enabling communication between a local device of a first network having a predetermined upper layer address space; and a remote device having an upper layer address outside the first network's address space and a lower layer address; the method including:

assigning an upper layer address to the remote device that is within the first network's upper layer address space;

providing the local device with the lower layer address of the remote device to enable communication between the devices.

In a second aspect there is also provided a method for enabling communication between a local device of a first network having a predetermined upper layer address space; and a remote device having a native upper layer address outside the first network's address space and a lower layer address; the method including;

receiving a request from the local device for the remote device's lower layer address;

providing the local device with the remote device's lower layer address;

switching traffic transmitted from the local device using the remote device's lower layer address, to the remote device, using the remote device's lower layer address and native upper layer address.

In certain embodiments the method can further include, assigning to the remote device a local upper layer address that is within the network's upper layer address space that is used by the local device during communication with the remote device.

In yet another aspect the present invention provides a computer network including, a local device that is part of a first sub-network in which all devices have upper layer addresses within a predetermined upper layer address space;

a remote device having a native upper layer address outside the first sub-network's predetermined upper layer address space, and a lower layer address; and a switching device configured receive a communication from the local device addressed to the remote device using an upper layer address assigned to the remote device that is within the first sub-network's upper layer address space and the remote device's lower layer address, and to switch the communication to the remote device using the native upper layer address and lower layer address of the remote device.

The computer network can further include a remote broadcast response agent configured to respond to broadcasts on the first sub-network on behalf of the remote device using at least the lower layer address of the remote device.

In another aspect of the present invention there is provided a switching device for switching a communication between a first device that is part of a first sub-network in which all devices have upper layer addresses within a predetermined upper layer address space and a second device having a native upper layer address outside the first sub-network's predetermined upper layer address space and a lower layer address, and an assigned upper layer address within the predetermined upper layer address space of the first sub-network;

the switching device being configured, in the event that a communication from the first device is addressed to the second device using its assigned upper layer address within the first sub-network's address space and the second device's lower layer address, to switch the communication to the second device using the native upper layer address and lower layer address of the second device.

The switching device is preferably an edge services node of a network.

In yet another aspect the present invention provides a computer program configured to be run on a processor: of a node of a computer network to control the switching of a communication between a first device that is part of a first sub-network in which all devices have upper layer addresses within a predetermined upper layer address space and a second device having a native upper layer address outside the first sub-network's predetermined upper layer address space and a lower layer address, and an assigned upper layer address within the predetermined upper layer address space of the first sub-network, wherein in the event in the event that a communication from the first device is addressed to the second device using its assigned upper layer, address within the first sub-network's address space and the second device's lower layer address the computer program causes the node to switch the communication to the second device using the native upper layer address and lower layer address of the second device. In another aspect the present invention extends to a computer readable medium storing such a computer program.

In the illustrative embodiments described herein the upper layer addresses are IP addresses and the lower layer addresses arc MAC addresses.

Thus in the illustrated embodiments, the present invention enables communication with a remote device as though it were part of a local network by providing a virtual presence for the remote device in the local network address space.

BRIEF DESCRIPTION OF THE DRAWINGS

Embodiments of the present invention will now be described, by way of non-limiting example only, with reference to the accompanying drawings, in which:

FIG. 3 shows a flowchart depicting the steps in a communicating data from the originating LAN to a remote terminal using a VPN in accordance with an embodiment of the present invention.

DETAILED DESCRIPTION OF THE INVENTION

Figure 1:
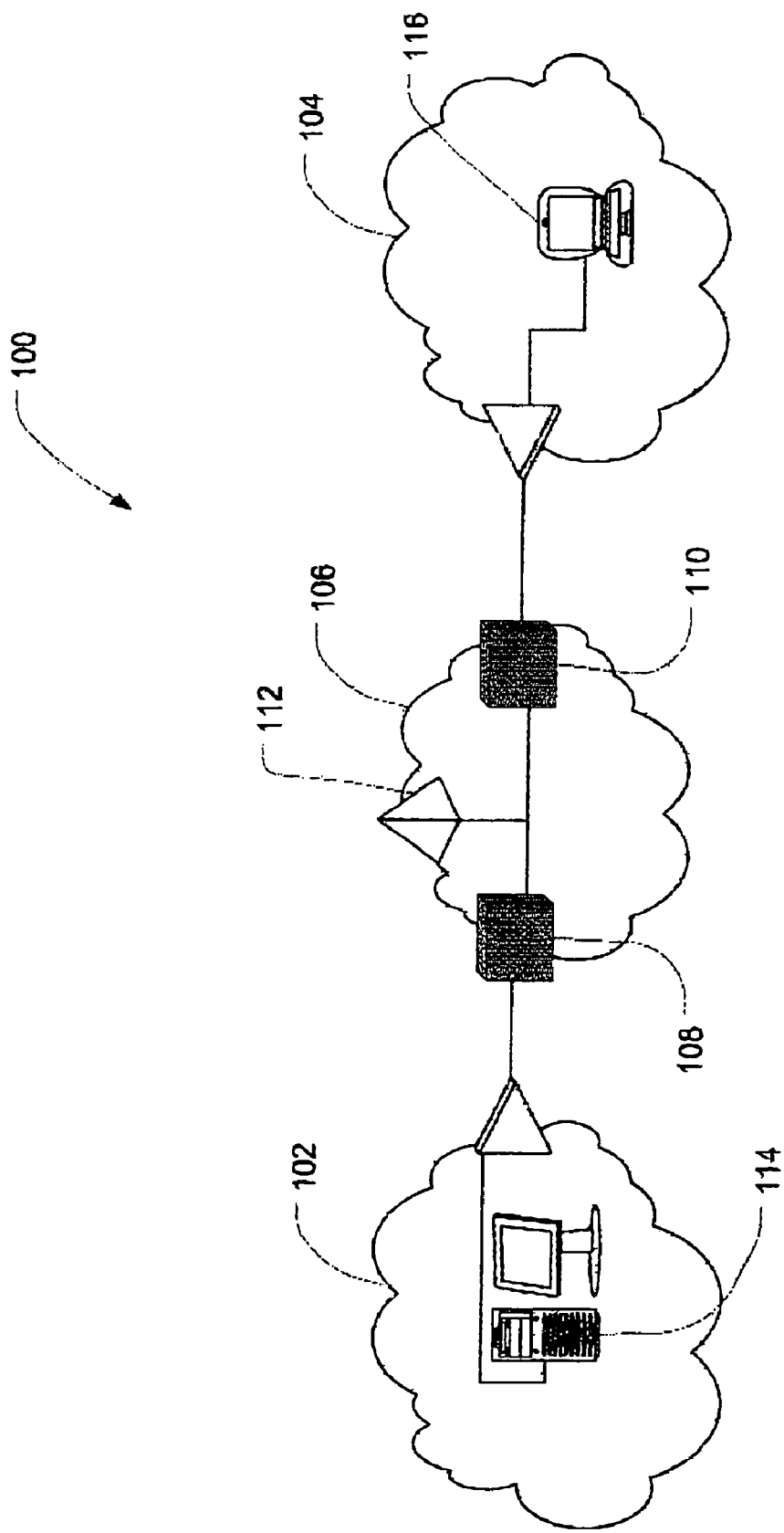
FIG. 1 shows a virtual private network that has been established according to an embodiment of the present invention.

FIG. 1 shows a schematic representation of a virtual private network embodying the present invention. The network 100 includes a first LAN 102 which belongs to a first organisation, and a second LAN 104 belonging to a second organisation. Interposed between the two LANs 102 and 104 is a layer 2 virtual private network (VPN) core 106. The LANs 102 and 104 are each connected to the layer 2 VPN core 106 by respective edge services nodes 108 and 110, and the VPN is controlled by the VPN service manager 112. As will be appreciated by those skilled in the art the connection between the LANs 102 and 104 and their respective edge services nodes can be of a variety of known types and will not be described further.

The present invention will be described in a situation in which a terminal, e.g. terminal 114, residing in the first LAN 102 wishes to form a virtual private network with a terminal 116 residing in the second LAN 104. In the present example this equates to the terminal 116 of LAN 104 being imported into the LAN 102 belonging to terminal 114. In the following description the term "local" will be used to refer to features or functions belonging to LAN 104 and terminal 114, whereas features and functions belonging to or performed by the second LAN 104 or terminal 116 will be referred to using the term "remote".

It should be noted that the network setup in FIG. 1 is susceptible to many alterations and changes. For example, the organisational LANs 102 and 104 may belong to an individual or a business of varying sizes. In a simple case one or both of the LANs could be a single computer. The present invention may also be applicable to virtual private networks involving more than two LANs. Moreover, the LANs being interconnected via the virtual private network can be subnetworks of a common larger network.

In the present example, the edge services nodes are the points of connection that each of the LANs has to its service provider. The functionality performed by the edge services nodes may also be provided by services node in an enterprise network as further described below. The operation of the present invention however, is not affected by the ownership of the services node, however it may be advantageous from a security point of view for the importing LAN to have control of it.

It should also be noted that the network being formed between the two LANs 102 and 104 in the present example is a layer 2 virtual private network however, the present invention may be applicable to any simple layer 2 connection between the edge services nodes of each of the interconnected LANs 102 and 104.

Figure 2:
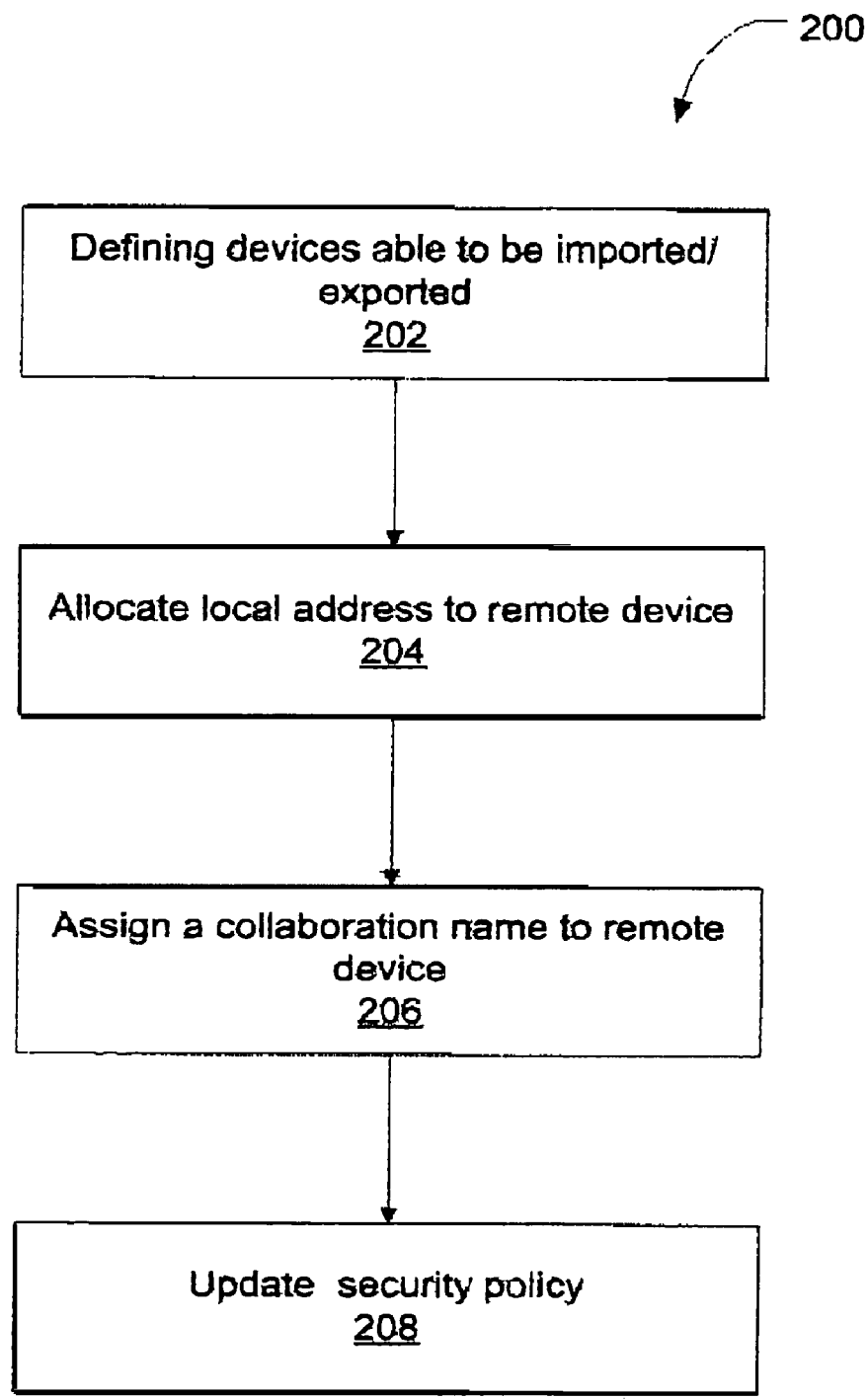
FIG. 2 shows a flowchart depicting the steps in a method of establishing a VPN in accordance with an embodiment of the present invention.

The process for configuring one or more LANs e.g. 102 and 104 to import and/or export devices with another LAN in accordance with a method of the present invention is depicted in FIG. 2. The process 200 begins at step 202 by defining which devices can be imported into or exported from their respective LANs. Each LAN will define its own permissions in the form of a list of devices which may be exported to other LANs and a list of devices belonging to other LANs which may be imported into its ID space. This process can be performed using the services manger 112 in a variety of ways that will be apparent to those of skill in the art. Typically each device authorised to either be imported into or exported from a LAN will be identified by it's lower layer (e.g. layer 2) address, upper layer (e.g. layer 3) network address and any identifier used within the core network, such as a VPN or VLAN ID. Typically the lower layer (layer 2) address will be an Ethernet MAC address, and the upper layer (layer 3) address an IP address.

After the permissions are set in step 202 local addresses are allocated to devices that can be imported from a foreign network. The allocation can be handled in a number of ways. For example, it can be handled by the services node independently of the LAN's existing address allocations. In this embodiment, the services node probes the organisation's LAN using, for example a protocol similar to the Zeroconf network address allocation protocol, as described in the May 2005 Internet Engineering Task Force ("IETF") Request for Comments ("RFC") 3927 document entitled "Dynamic Configuration of IPv4 Link-Local Addresses". The services node allocates addresses to the imported devices from the free list it maintains. In this embodiment the services node must continually update its free list in order to accommodate address changes within the LAN. This may be achieved in the manner described in the November 2001 IETF RFC 2026 document entitled "IPv4 Address Conflict Detection."

In alternative embodiments the LAN's entire addressing scheme can be outsourced to a dynamic host configuration protocol (DHCP) function in the services node. This embodiment gives total control of the address space of the LAN to the services node including the ability to allocate an address to local devices running on the LAN as well as remote devices being imported into the LAN. In another embodiment the services node makes a DHCP request of the organisation's DHCP server, on behalf of the imported machine. In further embodiments an address can be allocated to the imported device by the importing organisation using static allocation.

Once a local address has been assigned to each of the remote devices, a collaboration name is assigned to the imported device in step 206. The manner in which this step of the method is implemented depends largely upon the implementation chosen for step 204. One preferred solution is to use a combination of DNS service discovery and multicast DNS mechanisms in a manner that would be known to those skilled in the art. Details of the DNS service discovery and multicast DNS mechanisms are known to those skilled in the art. The name assignment can also be performed by hierarchical DNS servers where the LAN's DNS hands-off the address query to the VPN service provider's DNS. Alternatively, the collaboration name could statically assigned.

In the final step 208 of the method 200 the security policy of each of the services nodes involved in the import and export of a device into another LAN is updated. Updating should be performed whenever the import or export conditions for a particular device change as the services node is the security enforcement point for the VPN.

Communication between a device, for example device 114, in the local network 102 with the imported remote device, e.g. device 116, can operate in accordance with the method depicted in the flowchart of FIG. 3.

The flowchart 300 depicts the process conducted when the user of the local device wishes to communicate with a remote device across the VPN. The communication may be for any purpose, such as browsing a webpage, printing a picture or transferring a file.

The user of the remote device in an initial step 302 nominates the device with which it wishes to communicate using the remote device's collaboration name. The collaboration name was established in step 206 of the method of FIG. 2.

In the next step 304, the configuration name of the remote device is resolved into a layer 3 address within the local sub domain of the local device. That is, the local IP address of the remote device as assigned in step 204 above is identified for the remote device from the specified collaboration name. This address resolution step can be performed using Multicast DNS, Unicast DNS or other means that will be known to those skilled in the art.

In the next step 306, the local device broadcasts an address resolution protocol of request (ARP request) to determine the MAC address of the imported device.

The ARP request is answered (in step 308) by the edge services node on behalf of the remote device. Thus, the services node effectively provides a virtual presence on the network for the remote device by acting as a remote broadcast response agent (RBRA) for ARP request on behalf of the remote device. As will be appreciated by those skilled in the art the ARP response issued by the edge services node differs from a normal proxy-ARP response in that the RBRA uses the true MAC address of the remote device when responding to the ARP, rather than the services node's own MAC address, as would be the case for a normal proxy-ARP response. This difference is realised because in the present embodiment rather than the services node operating as a layer 3 router as for proxy-ARP, the edge services node is operating as a layer 2 switch.

Having received a response to its ARP request the local device then initiates the transmission of its traffic using the correct layer 2 address for the imported device and the local IP address assigned to the imported device in step 310.

In the next step 312 the edge services node translates the destination IP address specified by the local device into the actual IP address of the remote device within its home LAN. It should be noted that this address translation being performed is a switching operation as the correct MAC address of both the local device and the remote device arc being used, and in so far as layer 2 transport is concerned these devices are directly able to communicate.

Finally in step 314, the communication between the local device and the remote device is completed by the remote device receiving the communication. It should be noted that the data received at the remote device is received with its own native MAC and IP addresses.

Reverse traffic, i.e. from the remote device to the local device, is transmitted in a similar fashion as will be appreciated by those skilled in the art and therefore will not be described here in further detail.

In an alternative embodiment not depicted in the figures the services node can be configured to initiate a reverse address allocation that assigns the local device a layer 3 address in the native network of the remote device when the RBRA returns the ARP response. The same protocol for assigning this address can be used as was used in the forward direction.

In such an embodiment the services node can provide a single layer 3 address to be used for each device in the local device's network, or multiple addresses can be provided for a corresponding multiplicity of devices in the local device's native network.

As will be appreciated by those skilled in the art prior to the services node responding to a broadcast request or address resolution protocol address or other transmission the services node will make relevant security checks to ascertain that the relevant permissions for the communication have been granted.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skillet in the art can be made thereto, without departing from the scope of the present invention. for example, functions performed by the VPN service provider's services nodes in the illustrative embodiment may alternatively be performed by a service node in either of the enterprise networks. In this regard, the illustrative embodiment describes an arrangement in which the remote broadcast response agent functionality and network address translation functionality are provided by the edge service node of the VPN service provider. In alternative embodiment these functions can be performed on the enterprise side, i.e. in the LAN. In such an implementation the role of the VPN service provider is simplified as the VPN service provider only needs to provide a Layer 2 VPN and does not need to perform any functions at Layer 3 or above. Clearly the network address translation could be performed by the edge services node to which the remote LAN is connected, or in a services node of the remote VPN.

The invention claimed is:

1. A method for enabling communication between a local device of a first network having a predetermined upper layer address space, and a remote device having a native upper layer address outside the predetermined upper layer address space of the first network and a lower layer address, the method including:
   assigning an upper layer address to the remote device that is within the predetermined upper layer address space of the first network; and
   providing the local device with the lower layer address of the remote device to enable the local device to communicate with the remote device whilst the remote device is operating outside of the first network.

2. The method of claim 1 wherein the lower layer address of the remote device is provided to the local device in response to a request transmitted by the local device.

3. The method as claimed in claim 2 wherein the method further includes:
   translating the assigned upper layer address of the remote device into the native upper layer address of the remote device during switching of a communication between the local device and the remote device.

4. The method of claim 3 wherein the method further includes providing the local device with the assigned upper layer address of the remote device.

5. The method of claim 1 in which the assigned upper layer address is a layer 3 address and the lower layer address is a layer 2 address.

6. The method of claim 4 wherein the method further includes, assigning a collaboration name to the remote device, and wherein the local device initiates communication with the remote device using the assigned collaboration name.

7. The method of claim 2 wherein the lower layer address of the remote device is provided to the local device by an agent device on behalf of the remote device.

8. The method of claim 1 wherein upper layer addresses within the predetermined upper layer address space include IP addresses and the lower layer address is a MAC address.

9. The method of claim 8 wherein the MAC address of the remote device is supplied to the local device in response to an address resolution protocol broadcast.

10. The method of claim 8 wherein the MAC address is provided to the local device by an agent device on behalf of the remote device.

11. A method for enabling communication between a local device of a first network having a predetermined upper layer address space, and a remote device having a native upper layer address outside the predetermined upper layer address space of the first network and a lower layer address, the method including:
   receiving a request from the local device for the lower layer address of the remote device;
   providing the local device with the lower layer address of the remote device; and
   switching traffic transmitted from the local device, which is operating within the first network, using the lower layer address of the remote device, to the remote device, which is operating outside of the first network, using the lower layer address of the remote device and the native upper layer address.

12. The method of claim 11 which further includes, assigning to the remote device a local upper layer address that is within the predetermined upper layer address space of the first network that is used by the local device during communication with the remote device.

13. The method of claim 12 which includes, assigning a collaboration name to the remote device for use by the local device when nominating a device for communication.

14. The method of claim 13 which further includes:
   receiving a request from the local device to resolve the collaboration name of the remote device into the local upper layer address assigned to the remote device; and
   communicating, to the local device, the local upper layer address assigned to the remote device.

15. The method of claim 11 wherein upper layer addresses within the predetermined upper layer address space include IP addresses and the lower layer address is a MAC address.

16. The method of claim 11 wherein the lower layer address of the remote device is supplied to the local device in response to an address resolution protocol broadcast.

17. A method useable by a local device belonging to a first network in which devices of a network have addresses within a predetermined upper layer address space, for communicating with a remote device having a native upper layer address outside the predetermined upper layer address space of the first network and a lower layer address, the method including:
   determining a local upper layer address within the predetermined upper layer address space of the first network that has been assigned to the remote device;
   sending a request for the lower layer address of the remote device using the determined local upper layer address of the remote device;
   receiving the lower layer address of the remote device in response to the request; and
   transmitting data intended for the remote device, which is operating outside of the first network, using the lower layer address of the remote device and determined local upper layer address.

18. The method of claim 17 in which the upper layer addresses are layer 3 addresses and the lower layer address is a layer 2 address.

19. A computer network including:
   a local device that is part of a first sub-network in which all devices have upper layer addresses within a predetermined upper layer address space;
   a remote device having a native upper layer address outside the predetermined upper layer address space of the first sub-network, and a lower layer address; and
   a switching device configured to receive a communication from the local device addressed to the remote device, which is operating outside of the first sub-network, using an upper layer address assigned to the remote device that is within the predetermined upper layer address space of the first sub-network and the lower layer address of the remote device, and to switch the communication to the remote device using the native upper layer address and lower layer address of the remote device.

20. The computer network of claim 19 further including a remote broadcast response agent configured to respond to broadcasts on the first sub-network on behalf of the remote device using at least the lower layer address of the remote device.

21. The computer network of claim 20 in which the switching device and remote broadcast response agent are combined in a single network element.

22. The computer network of claim 19 in which the remote device is part of a second sub-network in which all devices have addresses within a second predetermined upper layer address space.

23. The computer network of claim 19 in which the upper layer addresses are layer 3 addresses and the lower layer address is a layer 2 address.

24. A switching device for switching a communication between a first device that is part of a first sub-network in which all devices have upper layer addresses within a predetermined upper layer address space and a second device having a native upper layer address outside the predetermined upper layer address space of the first sub-network and a lower layer address, and an assigned upper layer address within the predetermined upper layer address space of the first sub-network;
   the switching device being configured, in the event that a communication from the first device is addressed to the second device using the assigned upper layer address of the second device within the predetermined upper layer address space of the first sub-network and the lower layer address of the second device, to switch the communication to the second device, which is operating outside of the first sub-network, using the native upper layer address and lower layer address of the second device.

25. The switching device of claim 24 which is further configured to respond to broadcasts on the first sub-network on behalf of the second device using at least the lower layer address of the second device.

26. The switching device of claim 24 further configured to provide the lower layer address of the second device in response to a request transmitted by the first device.

27. The switching device of claim 24 wherein the switching device is further configured to translate the assigned upper layer address of the second device into the native upper layer address of the second device during switching of the communication between the first device and the second device.

28. The switching device of claim 24 wherein the switching device is further configured to resolve a collaboration name assigned to the second device into the assigned upper layer address of the second device in response to a request received from the first device.

29. The switching device of claim 24 wherein the upper layer addresses are layer 3 addresses and the lower layer address is a layer 2 address.

30. The switching device of claim 24 wherein the upper layer addresses are IP addresses and the lower layer address is a MAC address.

31. The switching device of claim 24 wherein the switching device is an edge service node of a network.

32. A node of a computer network including a computer program configured to be run on a processor of the node to control switching of a communication between a first device that is part of a first sub-network in which all devices have upper layer addresses within a predetermined upper layer address space and a second device having a native upper layer address outside the predetermined upper layer address space of the first sub-network and a lower layer address, and an assigned upper layer address within the predetermined upper layer address space of the first sub-network, wherein in the event that a communication from the first device is addressed to the second device using the assigned upper layer address of the second device within the predetermined upper layer address space of the first sub-network and the lower layer address of the second device the computer program causes the node to switch the communication to the second device, which is operating outside of the first sub-network, using the native upper layer address and lower layer address of the second device.

33. The node of claim 32 which is further configured to cause the node to respond to broadcasts on the first sub-network on behalf of the second device using at least the lower layer address of the second device.

34. The node of claim 32 which is further configured to cause the node to provide the lower layer address of the second device in response to a request transmitted by the first device.

35. The node of claim 32 which is further configured to cause the node to translate the assigned upper layer address of the second device into the native upper layer address of the second device during switching of the communication between the first device and the second device.

36. The node of claim 32 wherein the upper layer addresses are layer 3 addresses and the lower layer address is a layer 2 address.

37. The node of claim 32 wherein the upper layer addresses are IP addresses and the lower layer address is a MAC address.

38. The node of claim 32 which is further configured to cause the node to resolve a collaboration name assigned to the second device into the assigned upper layer address of the second device in response to a request received from the first device.

39. A non-transitory computer readable storage medium encoded with a data structure arranged to store a computer program, said computer program being configured in use to control operation of a processor of a node of a computer network to control switching of a communication between a first device that is part of a first sub-network in which all devices have upper layer addresses within a predetermined upper layer address space and a second device having a native upper layer address outside the predetermined upper layer address space of the first sub-network and a lower layer address, and an assigned upper layer address within the predetermined upper layer address space of the first sub-network, wherein in the event that the communication from the first device is addressed to the second device using the assigned upper layer address of the second device within the predetermined upper layer address space of the first sub-network and the lower layer address of the second device, the computer program causes the node to switch the communication to the second device using the native upper layer address and the lower layer address of the second device.

* * * * *